United States Patent
Wu et al.

(10) Patent No.: US 9,373,176 B2
(45) Date of Patent: *Jun. 21, 2016

(54) IMAGE COMPRESSION METHOD AND APPARATUS FOR ENCODING PIXEL DATA OF FRAME INTO INTERLEAVED BIT-STREAM, AND RELATED IMAGE DECOMPRESSION METHOD AND APPARATUS

(71) Applicant: MEDIATEK INC., Hsin-Chu (TW)

(72) Inventors: Tung-Hsing Wu, Chiayi (TW); Kun-Bin Lee, Taipei (TW); Han-Liang Chou, Hsinchu County (TW); Ting-An Lin, Hsinchu (TW); Chi-Cheng Ju, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,701

(22) Filed: Jun. 30, 2015

(65) Prior Publication Data

US 2015/0319446 A1    Nov. 5, 2015

Related U.S. Application Data

(63) Continuation of application No. 14/048,060, filed on Oct. 8, 2013, now Pat. No. 9,098,887.

(60) Provisional application No. 61/712,975, filed on Oct. 12, 2012.

(51) Int. Cl.
*G06T 9/00* (2006.01)
*H04N 19/186* (2014.01)
(Continued)

(52) U.S. Cl.
CPC .............. *G06T 9/00* (2013.01); *H04N 19/182* (2014.11); *H04N 19/186* (2014.11); *H04N 19/88* (2014.11)

(58) Field of Classification Search
CPC .............. G06K 9/36; G06T 1/20; G06T 9/00; G06T 9/005; G06T 15/00; G06T 15/04; G06T 15/005; G06T 2208/28; H04N 1/417; H04N 1/64; H04N 19/00; H04N 19/12; H04N 19/136; H04N 19/186; H04N 19/172; H04N 19/174; H04N 19/176; H04N 19/42; H04N 19/423; H04N 19/433; H04N 19/507; H04N 19/537; H04N 19/577; H04N 19/59; H04N 19/593; H04N 19/61; H04N 19/70; H04N 19/80; H04N 19/90; H04N 19/93; H04N 19/98; G09G 3/3611; G09G 3/3648; G09G 2340/02; G09G 2340/18; H03M 7/40; H03M 7/46

See application file for complete search history.

(56) References Cited

U.S. PATENT DOCUMENTS 6,124,811 A    9/2000    Acharya
7,236,649 B2    6/2007    Fenney
(Continued)

FOREIGN PATENT DOCUMENTS

CN    101123727 A    2/2008

OTHER PUBLICATIONS

"International Search Report" mailed on Jan. 23, 2014 for International application No. PCT/CN2013/085144, International filing date:Oct. 12, 2013.

*Primary Examiner* — Jose Couso
(74) *Attorney, Agent, or Firm* — Winston Hsu; Scott Margo

(57) ABSTRACT

An image compression method includes at least the following steps: receiving a plurality of pixels of a frame, wherein pixel data of each pixel has a plurality of color channel data corresponding to a plurality of different color channels, respectively; encoding the pixel data of each pixel and generating bit-streams corresponding to the plurality of color channel data of the pixel, wherein the bit-streams corresponding to the plurality of color channel data of the pixel are separated; packing bit-streams of a same color channel data of different pixels into color channel bit-stream segments, wherein each of the bit-stream segments has a same predetermined size; and concatenating color channel bit-stream segments of the different color channels into a final bit-stream. Alternatively, color channel bit-stream segments of the same pixel are concatenated into a concatenated bit-stream portion, and concatenated bit-stream portions of different pixels are concatenated into a final bit-stream.

20 Claims, 9 Drawing Sheets

(51) Int. Cl.
*H04N 19/182* (2014.01)
*H04N 19/88* (2014.01)

(56) References Cited

U.S. PATENT DOCUMENTS

| | | | |
|---|---|---|---|
| 7,480,417 B2 | 1/2009 | Malvar | |
| 7,693,339 B2 | 4/2010 | Wittenstein | |
| 8,300,956 B2 | 10/2012 | Luttmer | |
| 8,600,181 B2 | 12/2013 | Niemi | |
| 8,718,147 B2 | 5/2014 | Hickey | |
| 9,098,887 B2 * | 8/2015 | Wu | G06T 9/00 |
| 2008/0123737 A1 | 5/2008 | Sekiguchi | |
| 2009/0322713 A1 | 12/2009 | Furihata | |

* cited by examiner

IMAGE COMPRESSION METHOD AND APPARATUS FOR ENCODING PIXEL DATA OF FRAME INTO INTERLEAVED BIT-STREAM, AND RELATED IMAGE DECOMPRESSION METHOD AND APPARATUS

CROSS REFERENCE TO RELATED APPLICATION

This is a continuation of U.S. application Ser. No. 14/048,060 (filed on Oct. 8, 2013), which claims the benefit of U.S. provisional application No. 61/712,975 (filed on Oct. 12, 2012). The entire contents of the related applications are incorporated herein by reference.

BACKGROUND

The disclosed embodiments of the present invention relate to image compression and decompression, and more particularly, to an image compression method and apparatus for encoding pixel data of one or more than one block into an interleaved bit-stream and related image decompression method and apparatus.

A conventional image compression scheme may partition a frame into a plurality of blocks, and uses each block as a compression unit to encode each block into a bit-stream. FIG. 1 is a diagram illustrating a bit-stream generated by encoding pixel data of one block according to the conventional image compression scheme. Suppose that each block BK includes N pixels, and the pixel data of each pixel include color channel data of different color channels (e.g., red channel R, green channel G, and blue channel B). As shown in FIG. 1, the $1^{st}$ pixel has color channel data $R_1, B_1, G_1$; the $2^{nd}$ pixel has color channel data $R_2, B_2, G_2$; the $3^{rd}$ pixel has color channel data $R_3, B_3, G_3$; and the $N^{th}$ pixel has color channel data $R_N, B_N, G_N$. The conventional image compression scheme encodes the pixel data of the block BK to generate a bit-stream BS composed of a plurality of bit-stream portions that are concatenated, where the bit-stream portions correspond to different color channels, and each of the bit-stream portions includes all encoded color channel data of the same color channel in the block BK. As shown in FIG. 1, one bit-stream portion is composed of encoded color channel data $R_1'$-$R_N'$ only, another bit-stream portion is composed of encoded color channel data $G_1'$-$G_N'$ only, and yet another bit-stream portion is composed of encoded color channel data $B_1'$-$B_N'$ only. When an image compressor at a transmitting end outputs the bit-stream shown in FIG. 1 to a receiving end, an image decompressor at the receiving end decodes the received bit-stream to reconstruct the pixel data of the block BK. As the bit-stream portions are concatenated, the bit-stream portions are decoded by the image decompressor one by one. As a result, the bit-stream portion composed of encoded color channel data $G_1'$-$G_N'$ has to be decoded after the bit-stream portion composed of encoded color channel data $R_1'$-$R_N'$ and the bit-stream portion composed of encoded color channel data $G_1'$-$G_N'$ have been decoded. Thus, the decoded pixel data of the $1^{st}$ pixel is fully reconstructed when the encoded color channel data $B_1'$ is decoded, the decoded pixel data of the $2^{nd}$ pixel is fully reconstructed when the encoded color channel data $B_2'$ is decoded, and so forth. The processing latency for obtaining decoded pixel data of one pixel is high, which results in degraded performance of the image decompressor. Besides, the receiving end requires a large data buffer to store all of the decoded color channel data obtained by decoding the encoded color channel data $R_1'$-$R_N'$ and $G_1'$-$G_N'$, which increases the hardware cost inevitably. To create the bit-stream BS shown in FIG. 1, the transmitting end also needs a large data buffer to store raw color channel data. Similarly, the buffer requirement and processing latency of the image compression are high.

SUMMARY

In accordance with exemplary embodiments of the present invention, an image compression method and apparatus for encoding pixel data of one or more than one block into an interleaved bit-stream and related image decompression method and apparatus are proposed.

According to a first aspect of the present invention, an exemplary image compression method is disclosed. The exemplary image compression method includes at least the following steps: receiving a plurality of pixels of a frame, wherein pixel data of each pixel has a plurality of color channel data corresponding to a plurality of different color channels, respectively; encoding the pixel data of each pixel and generating bit-streams corresponding to the plurality of color channel data of the pixel, wherein the bit-streams corresponding to the plurality of color channel data of the pixel are separated; packing bit-streams of a same color channel data of different pixels into color channel bit-stream segments, wherein each of the bit-stream segments has a same predetermined size; and concatenating color channel bit-stream segments of the different color channels into a final bit-stream.

According to a second aspect of the present invention, an exemplary image decompression method is disclosed. The exemplary image decompression method includes at least the following steps: receiving a bit-stream corresponding to a frame, wherein the bit-stream is composed of a plurality of color channel bit-stream segments that are concatenated, and each of the color channel bit-stream segments has a same predetermined size; and decoding the bit-stream into pixel data of a plurality of pixels in the frame, wherein each of the pixels has a plurality of color channel data corresponding to a plurality of different color channels, respectively.

According to a third aspect of the present invention, an exemplary image compression method is disclosed. The exemplary image compression method includes at least the following steps: receiving a plurality of pixels of a frame, wherein pixel data of each pixel has a plurality of color channel data corresponding to a plurality of different color channels, respectively; encoding the pixel data of each pixel and generating bit-streams corresponding to the plurality of color channel data of the pixel, wherein each bit-streams corresponding to single color channel data of the pixel is a color channel bit-stream segment; concatenating color channel bit-stream segments of a same pixel into a concatenated bit-stream portions; and concatenating concatenated bit-stream portions of different pixels into a final bit-stream.

According to a fourth aspect of the present invention, an exemplary image decompression method is disclosed. The exemplary image decompression method includes at least the following steps: receiving a bit-stream corresponding to a frame, wherein the bit-stream is composed of a plurality of color channel bit-stream segments that are concatenated, and each of the color channel bit-stream segments contains information corresponding to one pixel only; and decoding the bit-stream into pixel data of a plurality of pixels in the frame, and each of the pixels has a plurality of color channel data corresponding to a plurality of different color channels, respectively.

According to a fifth aspect of the present invention, an exemplary image compressor is disclosed. The exemplary image compressor includes an input port and an encoder. The input port is arranged for receiving a plurality of pixels of a frame, wherein pixel data of each pixel has a plurality of color channel data corresponding to a plurality of different color channels, respectively. The encoder is arranged for encoding the pixel data of each pixel and generating bit-streams corresponding to the plurality of color channel data of the pixel, wherein the bit-streams corresponding to the plurality of color channel data of the pixel are separated; packing bit-streams of a same color channel data of different pixels into color channel bit-stream segments, wherein each of the bit-stream segments has a same predetermined size; and concatenating color channel bit-stream segments of the different color channels into a final bit-stream.

According to a sixth aspect of the present invention, an exemplary image decompressor is disclosed. The exemplary image decompressor includes an input port and a decoder. The input port is arranged for receiving a bit-stream corresponding to a frame, wherein the bit-stream is composed of a plurality of color channel bit-stream segments that are concatenated, and each of the color channel bit-stream segments has a same predetermined size. The decoder is arranged for decoding the bit-stream into pixel data of a plurality of pixels in the frame, wherein each of the pixels has a plurality of color channel data corresponding to a plurality of different color channels, respectively.

According to a seventh aspect of the present invention, an exemplary image compressor is disclosed. The exemplary image compressor includes an input port and an encoder. The input port is arranged for receiving a plurality of pixels of a frame, wherein pixel data of each pixel has a plurality of color channel data corresponding to a plurality of different color channels, respectively. The encoder is arranged for encoding the pixel data of each pixel and generating bit-streams corresponding to the plurality of color channel data of the pixel, wherein each bit-stream corresponding to single color channel data of the pixel is a bit-stream segment; and concatenating color channel bit-stream segments of a same pixel into a concatenated bit-stream portions, and concatenating bit-stream portions of different pixels into a final bit-stream.

According to an eighth aspect of the present invention, an exemplary image decompressor is disclosed. The exemplary image decompressor includes an input port and a decoder. The input port is arranged for receiving a bit-stream corresponding to a frame, wherein the bit-stream is composed of a plurality of color channel bit-stream segments that are concatenated, and each of the color channel bit-stream segments contains information corresponding to one pixel only. The decoder is arranged for decoding the bit-stream into pixel data of a plurality of pixels in the frame, and each of the pixels has a plurality of color channel data corresponding to a plurality of different color channels, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
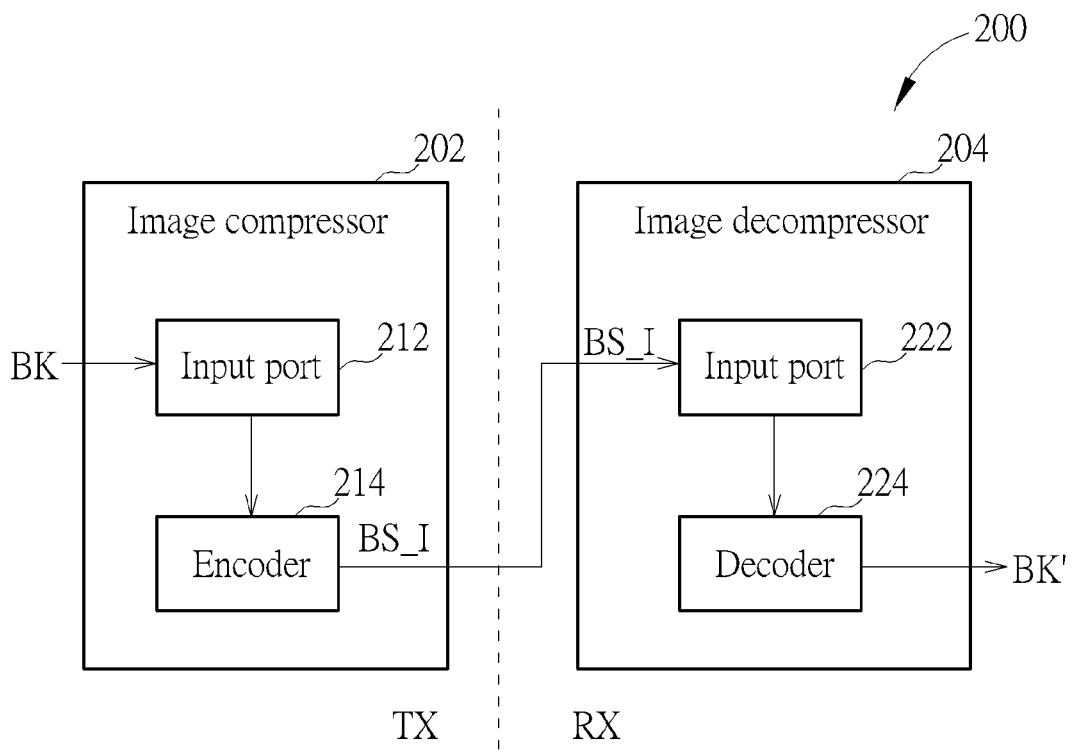
FIG. 2 is a diagram illustrating a data processing system according to an embodiment of the present invention.

FIG. 2 is a diagram illustrating a data processing system according to an embodiment of the present invention. The data processing system 200 includes an image compressor 202 and an image decompressor 204, where the image compressor 202 is located at a transmitting end TX, and the image decompressor 204 is located at a receiving end RX. Several exemplary applications using the proposed data processing system 200 are illustrated in FIGS. 3-5 for illustrative purposes.

Figure 3:
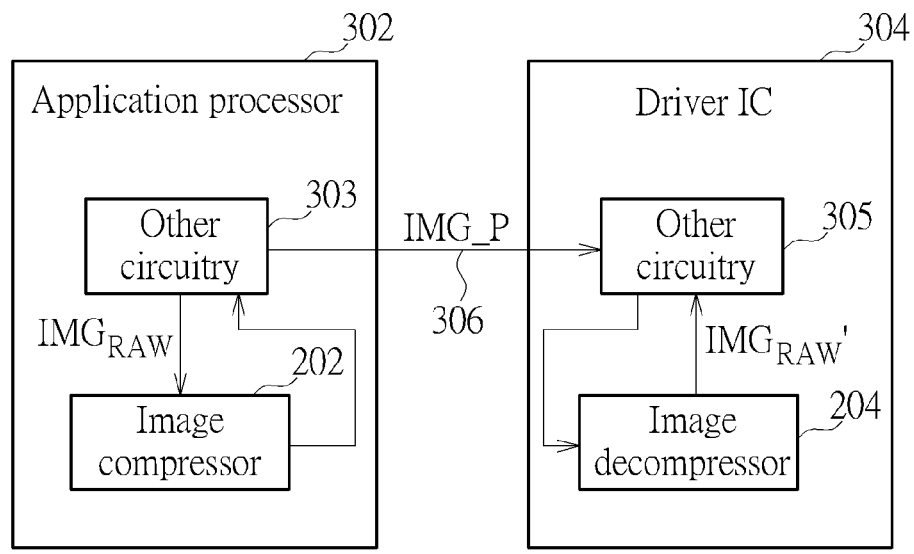
FIG. 3 is a diagram illustrating a first application which using the proposed data processing system.

FIG. 3 is a diagram illustrating a first application which using the proposed data processing system. An application processor 302 includes the image compressor 202 and other circuitry 303. A driver integrated circuit (IC) 304 has the image decompressor 204 and other circuitry 305. The other circuitry 303 in the application processor 302 generates a raw image $IMG_{RAW}$ to the image compressor 202. The application processor 302 may apply pixel processing to the raw image $IMG_{RAW}$ before outputting the raw image $IMG_{RAW}$. The image compressor 202 is coupled to the other circuitry 303, and performs lossy/lossless image compression upon the raw image $IMG_{RAW}$ to generate a compressed/encoded image IMG_P, wherein the compressed/encoded image IMG_P is transmitted to a display interface 306 through the other circuitry 303. In the present invention, the compressed/encoded image IMG_P is composed of interleaved bit-streams that are concatenated, where each interleaved bit-stream is generated by encoding one or more than one block of the raw image $IMG_{RAW}$. The application processor 302 transmits the compressed/encoded image IMG_P to the driver IC 304 via the display interface 306. For example, the display interface 306 may be a display serial interface (DSI) standardized by a Mobile Industry Processor Interface (MIPI) or an embedded display port (eDP) standardized by a Video Electronics Standards Association (VESA).

The image decompressor 204 receives the compressed/encoded image IMG_P from the display interface 306, and then transmits the compressed/encoded image IMG_P to the image decompressor 204 through other circuitry 305. The image decompressor 204 performs lossy/lossless decompression upon the compressed/encoded image IMG_P to recover a raw image $IMG_{RAW}'$, and transmits the raw image $IMG_{RAW}'$ to the other circuitry 305 for further processing. If a lossless compression algorithm is employed by the image compressor 202, the raw image $IMG_{RAW}'$ generated from a corresponding lossless decompression algorithm would be identical to the raw image $IMG_{RAW}$. However, if a lossy compression algorithm is employed by the image compressor 202, the raw image $IMG_{RAW}'$ generated from a corresponding lossy decompression may not be identical to the raw image $IMG_{RAW}$. Compared to transmitting the raw image $IMG_{RAW}$ over the display interface 306 directly, transmitting the compressed/encoded image IMG_P over the display interface 306 has smaller data size/lower data rate. Hence, the power consumption of the display interface 306 is reduced correspondingly. Besides, the image compressor 202 is configured to generate an interleaved bit-stream having a bit-stream structure different from that possessed by the conventional bit-stream shown in FIG. 1. In this way, the data buffer requirement of the driver IC 304 (i.e., the decoder-side buffer requirement) can be reduced, and the processing latency of obtaining decoded pixel data of one pixel is reduced due to reduced buffer overhead. Besides, the buffer requirement and processing latency of the application processor 302 are reduced.

Figure 4:
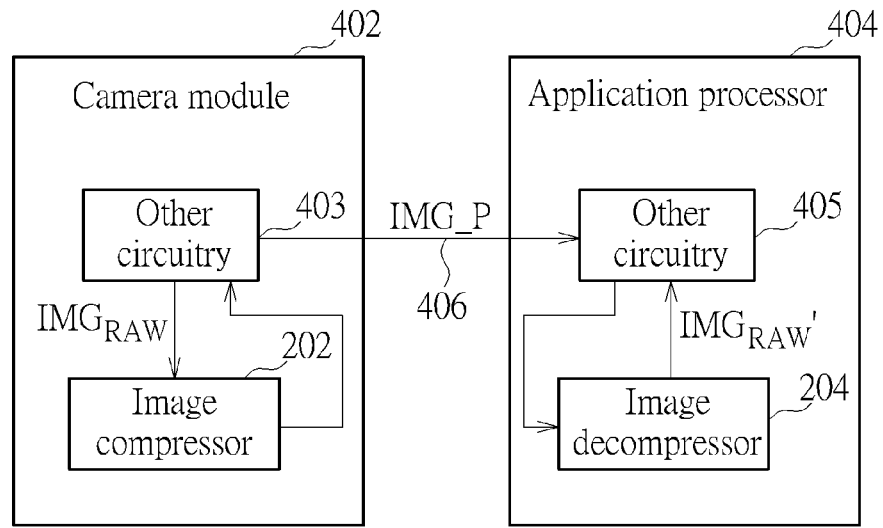
FIG. 4 is a diagram illustrating a second application which using the proposed data processing system.
Figure 5:
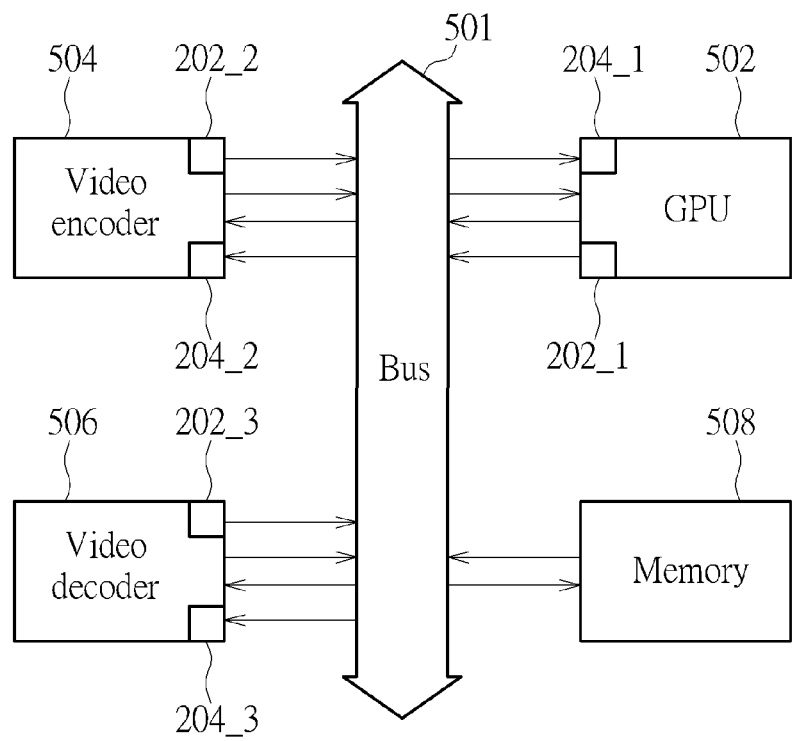
FIG. 5 is a diagram illustrating a third application which using the proposed data processing system.

FIG. 4 is a diagram illustrating a second application which using the proposed data processing system. A camera module 402 includes the image compressor 202 and other circuitry 403. An application processor 404 has the image decompressor 204 and other circuitry 405. The other circuitry 403 of the camera module 402 is coupled to the image compressor 202, and generates a raw image $IMG_{RAW}$ to the image compressor 202. The other circuitry 403 may apply pixel processing to the raw image $IMG_{RAW}$ before outputting the raw image $IMG_{RAW}$. The image compressor 202 performs lossy/lossless image compression upon the raw image $IMG_{RAW}$ to generate a compressed/encoded image IMG_P, where the compressed/encoded image IMG_P is transmitted to a camera interface 406 through the other circuitry 403. In the present invention, the compressed/encoded image IMG_P is composed of interleaved bit-streams that are concatenated, where each interleaved bit-stream is generated by encoding one or more than one block of the raw image $IMG_{RAW}$. The camera module 402 transmits the compressed/encoded image IMG_P to the application processor 404 via the camera interface 406. For example, the camera interface 406 may be a camera serial interface (CSI) standardized by a Mobile Industry Processor Interface (MIPI).

The application processor 404 receives the compressed/encoded image IMG_P from the camera interface 406, and then transmits the compressed/encoded image IMG_P to the image decompressor 204 through other circuitry 405. The application processor 404 performs lossy/lossless decompression upon the compressed/encoded image IMG_P to recover a raw image $IMG_{RAW}'$, and transmits the raw image $IMG_{RAW}'$ to the other circuitry 405 for further processing. If a lossless compression algorithm is employed by the image compressor 202, the raw image $IMG_{RAW}'$ generated from a corresponding lossless decompression algorithm would be identical to the raw image $IMG_{RAW}$. However, if a lossy compression algorithm is employed by the image compressor 202, the raw image $IMG_{RAW}'$ generated from a corresponding lossy decompression may not be identical to the raw image $IMG_{RAW}$. Similarly, compared to transmitting the raw image $IMG_{RAW}$ over the camera interface 406 directly, transmitting the compressed/encoded image IMG_P over the camera interface 406 has smaller data size/lower data rate. Hence, the power consumption of the camera interface 406 is reduced correspondingly. Besides, the image compressor 202 is configured to generate an interleaved bit-stream having a bit-stream structure different from that possessed by the conventional bit-stream shown in FIG. 1. Hence, the buffer requirement of the application processor 404 (i.e., the decoder-side buffer requirement) can be reduced, and the processing latency of obtaining decoded pixel data of one pixel is reduced due to reduced buffer overhead. Besides, the buffer requirement and processing latency of the camera module 402 are reduced.

FIG. 5 is a diagram illustrating a third application which using the proposed data processing system. In this embodiment, the proposed data processing system is employed by a graphics platform having, for example, a graphics processing unit (GPU) 502, a video encoder 504, a video decoder 506 and a memory 508. The GPU 502, video encoder 504, video decoder 506 and memory 508 communicate with one another through a bus 501. Each of the GPU 502, video encoder 504 and video decoder 506 is equipped with an image compressor 202_1/202_2/202_3 and an image decompressor 204_1/204_2/204_3. As compressed/encoded images are transmitted through the bus 501, the bandwidth of the bus 501 can be reduced. Besides, the image compressor 202_1/202_2/202_3 is configured to generate an interleaved bit-stream having a bit-stream structure different from that possessed by the conventional bit-stream shown in FIG. 1. In this way, the decoder-side buffer requirement can be reduced, and the decoder-side processing latency of obtaining decoded pixel data of one pixel is reduced due to reduced buffer overhead. Besides, the encoder-side buffer requirement and processing latency are reduced.

Further details directed to generating an interleaved bit-stream (i.e., a final bit-stream) with a novel bit-stream structure for buffer requirement reduction and processing latency reduction are described as follows. Please refer to FIG. 2 again. The image compressor 202 has an input port 212 and an encoder 214. The input port 212 is arranged for receiving pixel data of one or more than one block BK of a frame (e.g., a raw image) from a preceding circuit element. It should be noted that the preceding circuit element may apply pixel processing to pixels in the frame before outputting the frame to the image compressor 202. The block BK includes a plurality of pixels, and pixel data of each of the pixels has a plurality of color channel data corresponding to a plurality of different color channels, respectively. By way of example, but not limitation, the color channels may correspond to an RGB format or a YUV (YCrCb) format. However, this is for illustrative purposes only, and is not meant to be a limitation of the present invention. That is, the proposed image compression method can be applied to pixels each having more than one color channel data.

Figure 6:
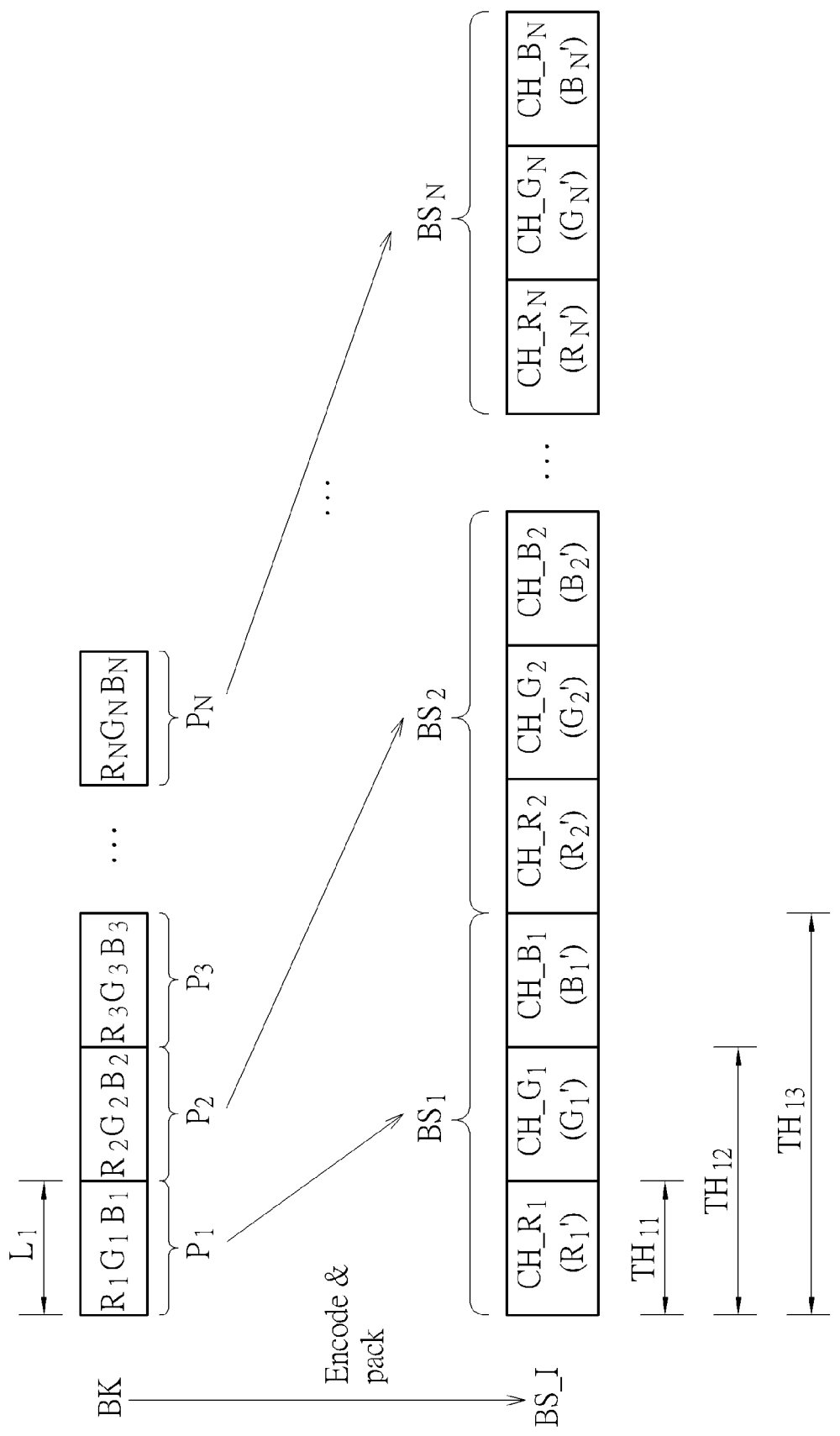
FIG. 6 is a diagram illustrating an image compression operation according to an embodiment of the present invention.

The encoder 214 is a core part of the image compressor 202, and may employ a lossless compression algorithm or a lossy compression algorithm, depending upon actual application requirements. The encoder 214 is arranged for encoding/compressing the pixel data of the block BK into an interleaved bit-stream BS_I composed of a plurality of color channel bit-stream segments that are concatenated, wherein each of the color channel bit-stream segments comprises color channel information of one color channel. Please refer to FIG. 6, which is a diagram illustrating an image compression operation performed by the encoder 214. The encoder 214 encodes the pixel data of the block BK into an interleaved bit-stream BS_I. In this embodiment, the block BK may be regarded as having a plurality of pixel data parts $P_1$-$P_N$, each having the same data length $L_1$; and each of the pixel data parts $P_1$-$P_N$ includes different color channel data of a single pixel. That is, the pixel data part $P_1$ includes pixel data of the $1^{st}$ pixel in the block BK, the pixel data part $P_2$ includes pixel data of the $2^{nd}$ 2 pixel in the block BK, and so on. As shown in FIG. 6, the encoder 214 encodes pixel data parts $P_1$-$P_N$ (i.e., pixel data of pixels in the same block BK) into bit-streams $BS_1$-$BS_N$, where the bit-streams $BS_1$-$BS_N$ are concatenated, and each of the bit-streams $BS_1$-$BS_N$ is a set of color channel bit-stream segments of different color channels. The bit-stream $BS_1$ has color channel bit-stream segments $CH\_R_1$, $CH\_G_1$, $CH\_B_1$; the bit-stream $BS_2$ has color channel bit-stream segments $CH\_R_2$, $CH\_G_2$, $CH\_B_2$; and the bit-stream $BS_N$ has color channel bit-stream segments $CH\_R_N$, $CH\_G_N$, $CH\_B_N$. The color channel bit-stream segments $CH\_R_1$, $CH\_G_1$, $CH\_B_1$ include encoded color channel data $R_1'$, $G_1'$, $B_1'$ (i.e., bit-streams derived from encoding color channel data $R_1$, $G_1$, $B_1$), respectively; color channel bit-stream segments $CH\_R_2$, $CH\_G_2$, $CH\_B_2$ include encoded color channel data $R_2'$, $G_2'$, $B_2'$ (i.e., bit-streams derived from encoding color channel data $R_2$, $G_2$, $B_2$), respectively; and color channel bit-stream segments $CH\_R_N$, $CH\_G_N$, $CH\_B_N$ include encoded color channel data $R_N'$, $G_N'$, $B_N'$ (i.e., bit-streams derived from encoding color channel data $R_N$, $G_N$, $B_N$), respectively. In other words, bit-streams of the same color channel data included in pixel data of different pixels are packed into color channel bit-stream segments, and color channel bit-stream segments of different color channel data are concatenated into a final bit-stream (i.e., the interleaved bit-stream BS_I).

It should be noted that the fixed data length $L_1$ is not limited to pixel data of one pixel. In an alternative design, the encoder 214 may take pixel data of more than one pixel as one pixel data part to be encoded into color channel bit-segment segments. Please refer to FIG. 7, which is a diagram illustrating another image compression operation performed by the encoder 214. In this embodiment, the block BK may be regarded as having a plurality of pixel data parts $P_1$-$P_M$, each having the same data length $L_2$; and each of the pixel data parts $P_1$-$P_M$ includes different color channel data of multiple pixels (e.g., two pixels). That is, the pixel data part $P_1$ includes pixel data of the $1^{st}$ pixel and the $2^{nd}$ pixel in the block BK, the pixel data part $P_2$ includes pixel data of the $3^{rd}$ pixel and the $4^{th}$ pixel in the block BK, and so on. Hence, $L_2 = L_1 * 2$.

Figure 7:
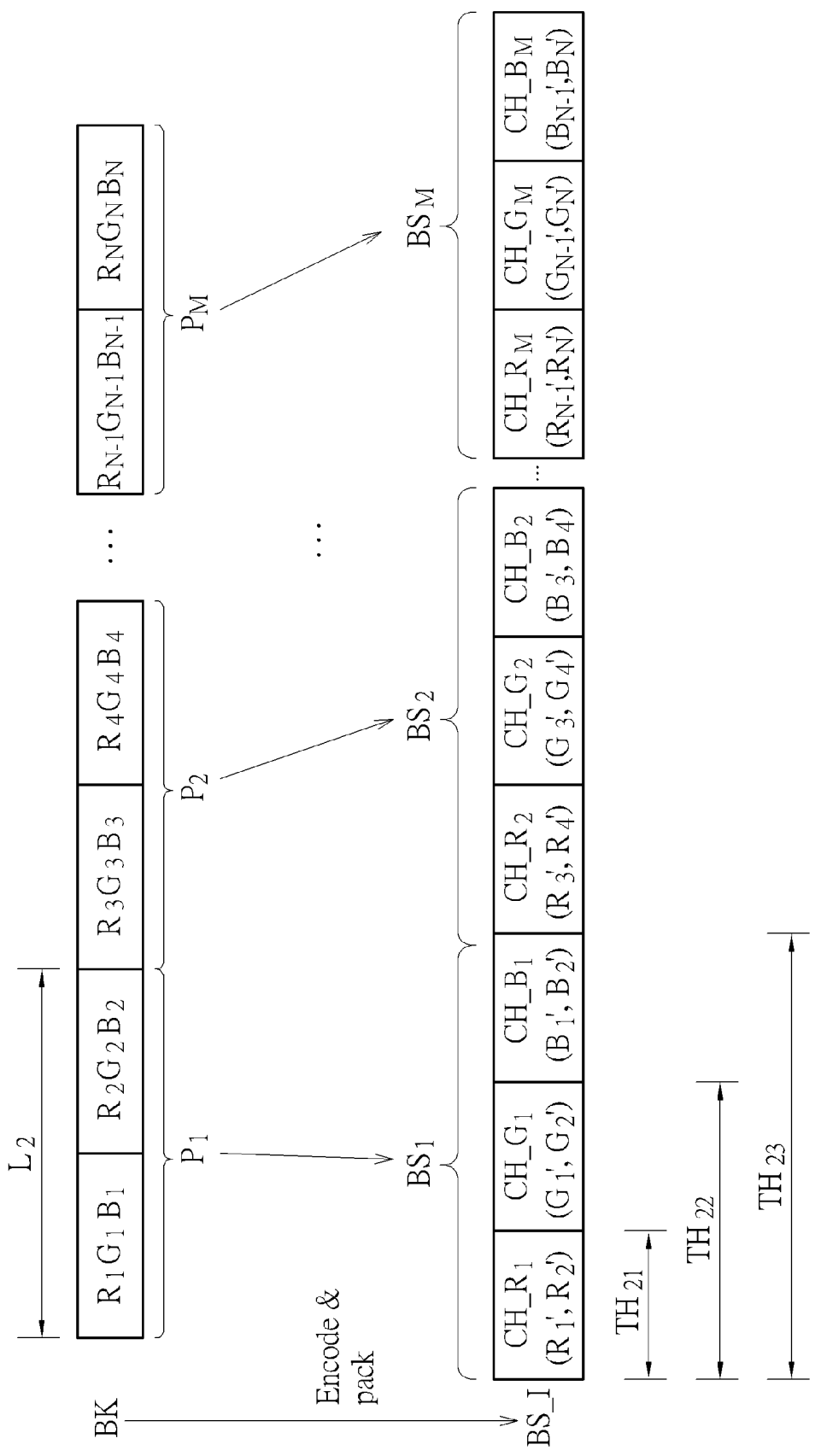
FIG. 7 is a diagram illustrating another image compression operation according to an embodiment of the present invention.

As shown in FIG. 7, the encoder 214 encodes pixel data parts $P_1$-$P_M$ into bit-streams (i.e., sets of color channel bit-stream segments) $BS_1$-$BS_M$, where the bit-streams $BS_1$-$BS_M$ are concatenated, and $N = 2*M$. The bit-stream $BS_1$ has color channel bit-stream segments $CH\_R_1$, $CH\_G_1$, $CH\_B_1$; the bit-stream $BS_2$ has color channel bit-stream segments $CH\_R_2$, $CH\_G_2$, $CH\_B_2$; and the bit-stream $BS_N$ has color channel bit-stream segments $CH\_R_N$, $CH\_G_N$, $CH\_B_N$. As the encoder 214 takes pixel data of two pixels to be encoded into color channel bit-stream segments, the color channel bit-stream segments $CH\_R_1$, $CH\_G_1$, $CH\_B_1$ include encoded color channel data $(R_1', R_2')$, $(G_1', G_2')$, $(B_1', B_2')$, that is, bit-streams derived from encoding color channel data $(R_1, R_2)$, $(G_1, G_2)$, $(B_1, B_2)$, respectively; color channel bit-stream segments $CH\_R_2$, $CH\_G_2$, $CH\_B_2$ include encoded color channel data $(R_3', R_4')$, $(G_3', G_4')$, $(B_3', B_4')$, that is, bit-streams derived from encoding color channel data $(R_3, R_4)$, $(G_3, G_4)$, $(B_3, B_4)$, respectively; and color channel bit-stream segments $CH\_R_M$, $CH\_G_M$, $CH\_B_M$ include encoded color channel data $(R_{N-1}', R_N')$, $(G_{N-1}', G_N')$, $(B_{N-1}', B_N')$, that is, bit-streams derived from encoding color channel data $(R_{N-1}, R_N)$, $(G_{N-1}, G_N)$, $(B_{N-1}, B_N)$, respectively. Similarly, bit-streams of the same color channel data included in pixel data of different pixels are packed into color channel bit-stream segments, and color channel bit-stream segments of different color channel data are concatenated into a final bit-stream (i.e., the interleaved bit-stream BS_I).

Though the pixel data parts $P_1$-$P_N$ (or $P_1$-$P_M$) encoded by the encoder 214 have the same data length $L_1$ (or $L_2$), the bit-steams $BS_1$-$BS_N$ (or $BS_1$-$BS_M$) may not have the same data length due to the fact that the number of bits of each encoded color channel data is not fixed. The bit variation of color channel bit-stream segments makes the design of the decoder 224 become complicated. In order to constrain the decoding complexity, one or more predetermined thresholds may be used by the encoder 214 to limit the bit-stream size of color channel bit-stream segment (s). In a first exemplary design, a length of each color channel bit-stream segment is limited by a predetermined threshold. For one example, a length of each color channel bit-stream segment $CH\_R_1$, $CH\_G_1$, $CH\_B_1$ ... $CH\_R_N$, $CH\_G_N$, $CH\_B_N$ shown in FIG. 6 is limited by the predetermined threshold $TH_{11}$. For another example, a length of each color channel bit-stream segment $CH\_R_1$, $CH\_G_1$, $CH\_B_1$ ... $CH\_R_M$, $CH\_G_M$, $CH\_B_M$ shown in FIG. 7 is limited by the predetermined threshold $TH_{21}$. In a second exemplary design, a total length of multiple concatenated color channel bit-stream segments is limited by a predetermined threshold. For one example, a total length of any two color channel bit-stream segments (e.g., CH_R+CH_G, CH_R+CH_B, CG_G+CH_B) in bit-streams $BS_1$-$BS_N$ shown in FIG. 6 is limited by the predetermined threshold $TH_{12}$, and/or a total length of any three concatenated color channel bit-stream segments (e.g., CH_R+CH_G+CH_B) in bit-streams $BS_1$-$BS_N$ shown in FIG. 6 is limited by another predetermined threshold $TH_{13}$. For another example, a total length of any two concatenated color channel bit-stream segments (e.g., CH_R+CH_G, CH_R+CH_B, CG_G+CH_B) in bit-streams $BS_1$-$BS_M$ shown in FIG. 7 is limited by one predetermined threshold $TH_{22}$, and/or a total length of any three concatenated color channel bit-stream segments (e.g., CH_R+CH_G+CH_B) in bit-streams $BS_1$-$BS_M$ shown in FIG. 7 is limited by another predetermined threshold $TH_{23}$.

It should be noted that each predetermined threshold $TH_{11}/TH_{12}/TH_{13}/TH_{21}/TH_{22}/TH_{23}$ is configured before the encoder 214 starts encoding pixel data of the block BK. Thus, the encoder 214 is capable of preventing the interleaved bit-stream BS_I from violating the constraint. By way of example, the image decompressor 204 may inform the image compressor 202 of its decoding capability. The image compressor 202 therefore refers to the decoding capability of the image decompressor 204 to properly configure one or more predetermined thresholds to be referenced by the encoder 214 during image compression. Hence, the encoder 214 may adaptively adjust the quantization level to make each color channel bit-stream segment not exceed the threshold $TH_{11}$ (or $TH_{21}$), at least two color channel bit-stream segments in bit-stream not exceed the threshold $TH_{12}$ (or $TH_{22}$), and/or three color channel bit-stream segments in bit-stream not exceed the threshold $TH_{13}$ (or $TH_{23}$).

In above examples shown in FIG. 6 and FIG. 7, pixel data of each pixel has color channel data corresponding to three color channels, respectively. In practice, the proposed image compression method discussed above can be applied to pixels each having more than one color channel data. For example, in a first case where each pixel of a frame has two color channel data, the proposed image compression method is configured for concatenating a color channel bit-stream segment of a first color channel to a color channel bit-stream segment of a second color channel. In a second case where each pixel of a frame has three color channel data, the proposed image compression method is configured for concatenating a color channel bit-stream segment of a first color channel to a color channel bit-stream segment of a second color channel, and concatenating a color channel bit-stream segment of a third color channel to the color channel bit-stream segment of the second color channel. In a third case where each pixel of a frame has four color channel data, the proposed image compression method is configured for concatenating a color channel bit-stream segment of a first color channel to a color channel bit-stream segment of a second color channel; concatenating a color channel bit-stream segment of a third color channel to the color channel bit-stream segment of the second color channel; and concatenating a color channel bit-stream segment of a fourth color channel to the color channel bit-stream segment of the third color channel.

In above examples shown in FIG. 6 and FIG. 7, each of the color channel bit-stream segments is generated by encoding fixed-length pixel data parts of the block BK. Thus, each color channel bit-stream segment has a variant data length, and is constrained by a predetermined threshold. For example, each of the color channel bit-stream segments included in the interleaved bit-stream BS_I is shorter or equal to the predetermined threshold $TH_{11}$ (or $TH_{21}$). In an alternative design, the color channel bit-stream segments in the final bit-stream have fixed lengths, where each fixed length meets the decoding capability of the decoder 224. Please refer to FIG. 8, which is a diagram illustrating the interleaved bit-stream BS_I having fixed-length color channel bit-stream segments according to an embodiment of the present invention. In this embodiment, each color channel bit-stream segment for the red channel has a fixed length $L_R$, each color channel bit-stream segment for the green channel has a fixed length $L_G$, and each color channel bit-stream segment for the green channel has a fixed length $L_B$. The fixed lengths $L_R$, $L_G$, $L_B$ may have the same value or different values, depending upon design consideration.

For example, each of the fixed lengths $L_R$, $L_G$, $L_B$ is 10 bits. Suppose that the encoded color channel data $R_1'$ has 6 bits, the encoded color channel data $R_2'$ has 8 bits, the encoded color channel data $R_3'$ has 12 bits, the encoded color channel data $G_1'$ has 15 bits, the encoded color channel data $G_2'$ has 5 bits, the encoded color channel data $B_1'$ has 10 bits, the encoded color channel data $B_2'$ has 7 bits, and the encoded color channel data $R_3'$ has 7 bits. Hence, the color channel bit-stream segment CH_$R_1$ would be composed of the encoded color channel data $R_1'$ ($R_1CE$ bits) and part of the encoded color channel data $R_2'$ ($R_{21}':=4$ bits); the color channel bit-stream segment CH_$R_2$ would be composed of the remaining part of the encoded color channel data $R_2'$ ($R_{22}'=4$ bits) and part of the encoded color channel data $R_3'$ ($R_{31}'=6$ bits)$_1$ the color channel bit-stream segment CH_$G_1$ would be composed of part of the encoded color channel data $G_1'$ ($G_{11}':=10$ bits); the color channel bit-stream segment CH_$G_2$ would be composed of the remaining part of the encoded color channel data $G_1'$ ($G_{12}'=5$ bits) and the encoded color channel data $G_2'$ ($G_2'=5$ bits); the color channel bit-stream segment CH_$B_1$ would be composed of the encoded color channel data $B_1'$ ($B_1'=10$ bits); and the color channel bit-stream segment CH_$B_2$ would be composed of the encoded color channel data $B_2'$ ($B_2'=7$ bits) and part of the encoded color channel data $B_3'$ ($B_{31}'=3$ bits).

Since each color channel bit-stream segment for the same specific color channel is required to have a fixed segment length and the size of encoded color channel data of the same specific color channel in a block may not be an integer multiple of the fixed segment length, at least one color channel bit-stream segment in the interleaved bit-stream BS_I may include color channel information of the same specific color channel of different blocks. Please refer to FIG. 8 again. Suppose that the color channel data $R_1$-$R_N$ of all pixels in the block BK are converted into encoded color channel data $R_1'$-$R_N'$, where the total amount of the encoded color channel data $R_1'$-$R_N'$ is 105 bits. Since the fixed length $L_R$ is 10 bits, ten color channel bit-stream segments CH_$R_1$-CH_$R_{10}$ are used to carry 100 bits of the encoded color channel data $R_1'$-$R_N'$, thus leaving 5 bits of the encoded color channel data $R_1'$-$R_N'$ in the next color channel bit-stream segment CH_$R_{11}$. To make the color channel bit-stream segment CH_$R_{11}$ filled with 10 bits, 5 bits of the encoded color channel data belonging to a different block BK'' would be included in the color channel bit-stream segment CH_$R_{11}$. In other words, the color channel bit-stream segment CH_$R_{11}$ has color channel information of different blocks.

The aforementioned image compression operation shown in FIG. 6/FIG. 7 may be performed by an encoder implemented using pure hardware. With regard to the image compression operation shown in FIG. 6/FIG. 7, each set of color channel bit-stream segments (e.g., $BS_1$) is immediately generated and output by the encoder 214 at the time the required color channel bit-stream segments (e.g., CH_$R_1$, CH_$G_1$ and CH_$B_1$) are obtained by encoding part of the pixel data of the block BK. However, a different image compression operation may be performed by an encoder which is implemented by a processor executing software instructions. The same objective of generating the interleaved bit-stream BS_I is achieved.

Figure 9:
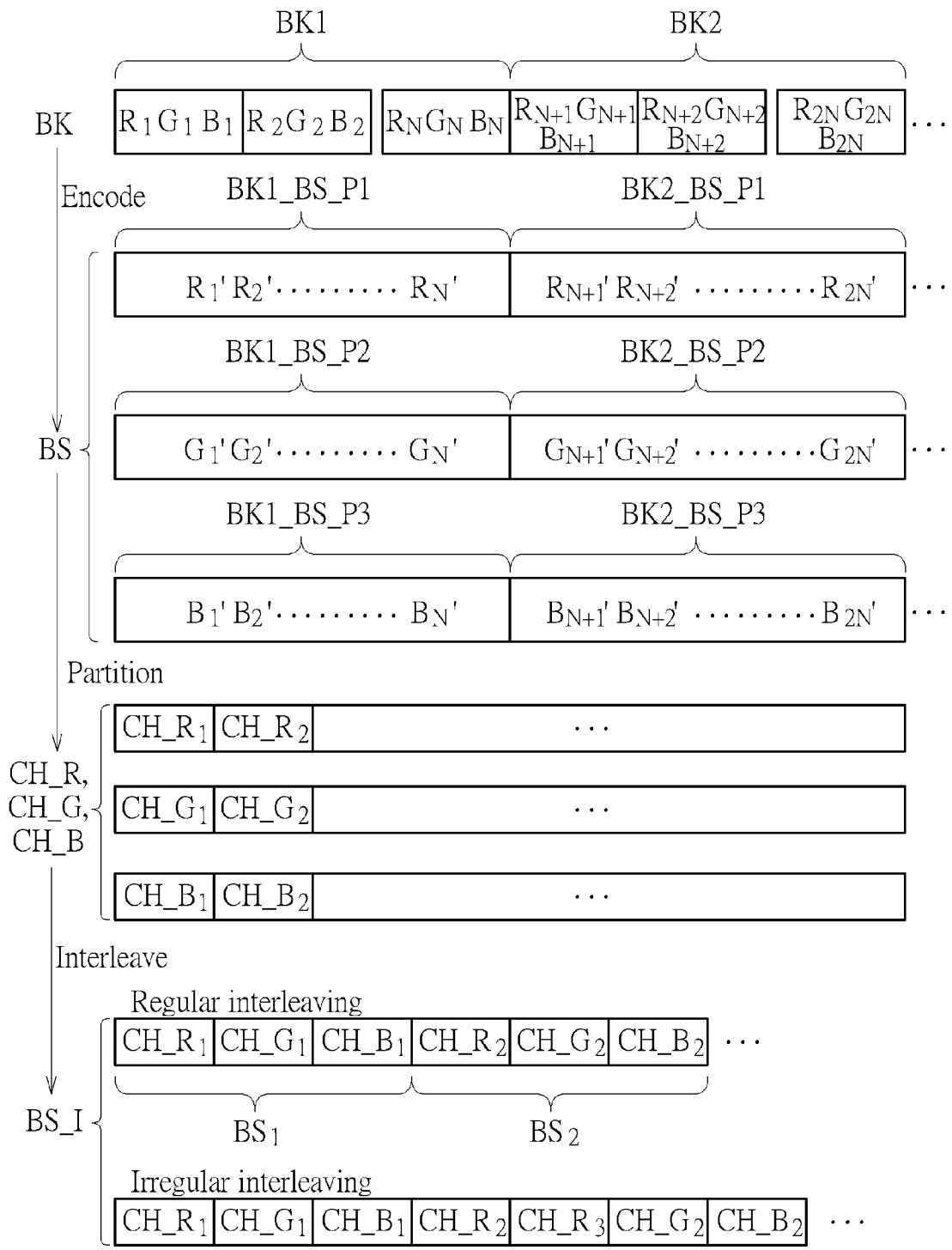
FIG. 9 is a diagram illustrating yet another image compression operation according to an embodiment of the present invention.

Please refer to FIG. 9, which is a diagram illustrating yet another image compression operation performed by the encoder 214. The encoder 214 first employs the conventional image compression scheme to encode pixel data of blocks (e.g., BK1 and BK2) into a bit-stream BS composed of a plurality of concatenated bit-stream portions BK1_BS_P1, BK1_BS_P2, BK1_BS_P3 for the block BK1 and a plurality of concatenated bit-stream portions BK2_BS_P1, BK2_BS_P2, BK2_BS_P3 for the next block BK2, where the bit-stream portions BK1_BS_P1, BK1_BS_P2, BK1_BS_P3 correspond to different color channels (e.g., red channel, green channel and green channel), and the bit-stream portions BK2_BS_P1, BK2_BS_P2, BK2_BS_P3 correspond to different color channels (e.g., red channel, green channel and green channel). Each of the bit-stream portions BK1_BS_P1, BK1_BS_P2, BK1_BS_P3 includes all encoded color channel data of the same color channel in the block BK1, and each of the bit-stream portions BK2_BS_P1, BK2_BS_P2, BK2_BS_P3 includes all encoded color channel data of the same color channel in the block BK2. As shown in FIG. 9, the bit-stream portion BK1_BS_P1 is composed of encoded color channel data $R_1'$-$R_N'$, the bit-stream portion BK1_BS_P2 is composed of encoded color channel data $G_1'$-$G_N'$, the bit-stream portion BK1_BS_P3 is composed of encoded color channel data $B_1'$-$B_N'$, the bit-stream portion BK2_BS_P1 is composed of encoded color channel data $R_{N+1}'-R_{2N}'$, the bit-stream portion BK2_BS_P2 is composed of encoded color channel data $G_{N+1}'-G_{2N}'$, and the bit-stream portion BK2_BS_P3 is composed of encoded color channel data $B_{N+1}'-B_{2N}'$. After encoding pixel data of the block BK1, the encoder 214 stores the bit-stream portions BK1_BS_P1, BK1_BS_P2, BK1_BS_P3 in a buffer (not shown). Similarly, after encoding pixel data of the block BK2, the encoder 214 stores the bit-stream portions BK2_BS_P1, BK2_BS_P2, BK2_BS_P3 in the buffer (not shown).

Next, when the bit-stream portions BK1_BS_P1, BK1_BS_P2, BK1_BS_P3 are available in the buffer, the encoder 214 is operative to partition each of the bit-stream portions BK1_BS_P1, BK1_BS_P2, BK1_BS_P3 into a plurality of color channel bit-stream segments. For one example, the bit-stream portion BK1_BS_P1 is partitioned into variable-length color channel bit-stream segments $CH\_R_1$, $CH\_R_2 \ldots CH\_R_N$ as shown in FIG. 6, the bit-stream portion BK1_BS_P2 is partitioned into variable-length color channel bit-stream segments $CH\_G_1$, $CH\_G_2 \ldots CH\_G_N$ as shown in FIG. 6, and the bit-stream portion BK1_BS_P3 is partitioned into variable-length color channel bit-stream segments $CH\_B_1$, $CH\_B_2 \ldots CH\_B_N$ as shown in FIG. 6. For another example, the bit-stream portion BK1_BS_P1 is partitioned into variable-length color channel bit-stream segments $CH\_R_1, CH\_R_2 \ldots CH\_R_M$ as shown in FIG. 7, the bit-stream portion BK1_BS_P2 is partitioned into variable-length color channel bit-stream segments $CH\_G_1, CH\_G_2 \ldots CH\_G_M$ as shown in FIG. 7, and the bit-stream portion BK1_BS_P3 is partitioned into variable-length color channel bit-stream segments $CH\_B_1, CH\_B_2 \ldots CH\_B_M$ as shown in FIG. 7. Similarly, when the bit-stream portions BK2_BS_P1, BK2_BS_P2, BK2_BS_P3 are available in the buffer, the encoder 214 is operative to partition each of the bit-stream portions BK2_BS_P1, BK2_BS_P2, BK2_BS_P3 into a plurality of color channel bit-stream segments.

The encoder 214 interleaves color channel bit-stream segments derived from partitioning the bit-stream portions to generate an interleaved bit-stream BS_I as shown in FIG. 6/FIG. 7. By way of example, but not limitation, the encoder 214 may employ a regular interleaving scheme to generate the interleaved bit-stream BS_I, such that the numbers of color channel bit-stream segments for different color channels in the same block are identical, and each set of color channel bit-stream segments is composed of color channel bit-stream segments for different color channels arranged in a regular color channel order (e.g., R->G->B). For one example, as shown in FIG. 6, the number of color channel bit-stream segments $CH\_R_1$-$CH\_R_N$ is equal to N, the number of color channel bit-stream segments $CH\_G_1$-$CH\_G_N$ is equal to N, and the number of color channel bit-stream segments $CH\_B_1$-$CH\_B_N$ is equal to N. Besides, in each set of color channel bit-stream segments, a red color channel bit-stream segment is followed by a green color channel bit-stream segment, and the green color channel bit-stream segment is followed by a blue color channel bit-stream segment. For another example, as shown in FIG. 7, the number of color channel bit-stream segments $CH\_R_1$-$CH\_R_M$ is equal to M, the number of color channel bit-stream segments $CH\_G_1$-$CH\_G_M$ is equal to M, and the number of color channel bit-stream segments $CH\_B_1$-$CH\_B_M$ is equal to M. Besides, in each set of color channel bit-stream segments, a red color channel bit-stream segment is followed by a green color channel bit-stream segment, and the green color channel bit-stream segment is followed by a blue color channel bit-stream segment.

Figure 8:
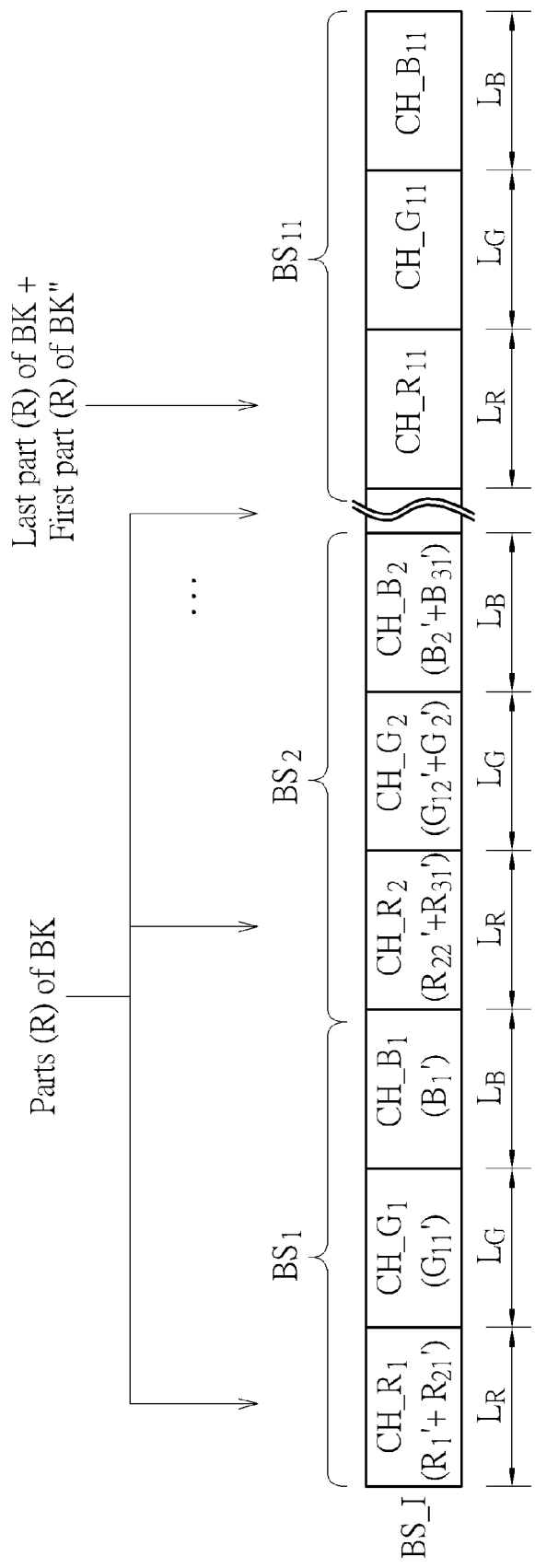
FIG. 8 is a diagram illustrating the interleaved bit-stream having fixed-length color channel bit-stream segments according to an embodiment of the present invention.

In an alternative design, when the bit-stream portions BK1_BS_P1, BK1_BS_P2, BK1_BS_P3 are available in the buffer, the encoder 214 is operative to partition each of the bit-stream portions BK1_BS_P1, BK1_BS_P2, BK1_BS_P3 based on the same predetermined size (i.e., a fixed segment size), such that the bit-stream portion BK1_BS_P1 is partitioned into fixed-length color channel bit-stream segments, including at least $CH\_R_1$, $CH\_R_2$ as shown in FIG. 8, the bit-stream portion BK1_BS_P2 is partitioned into fixed-length color channel bit-stream segments, including at least $CH\_G_1$ and $CH\_G_2$ as shown in FIG. 8, and the bit-stream portion BK1_BS_P3 is partitioned into fixed-length color channel bit-stream segments, including at least $CH\_B_1$, $CH\_B_2$, as shown in FIG. 8. Similarly, when the bit-stream portions BK2_BS_P1, BK2_BS_P2, BK2_BS_P3 are available in the buffer, the encoder 214 is operative to partition each of the bit-stream portions BK2_BS_P1, BK2_BS_P2, BK2_BS_P3 based on the same predetermined size (i.e., a fixed segment size), such that the bit-stream portion BK2_BS_P1 is partitioned into fixed-length color channel bit-stream segments, the bit-stream portion BK2_BS_P2 is partitioned into fixed-length color channel bit-stream segments, and the bit-stream portion BK2_BS_P3 is partitioned into fixed-length color channel bit-stream segments. It should be noted that one fixed-length color channel bit-stream segment (e.g., $CH\_R_{11}$ shown in FIG. 8) may include partial encoded color channel data of one block BK1 and partial encoded color channel data of another block BK2.

After the fixed-length color channel bit-stream segments of different color channels are sequentially obtained from partitioning the bit-stream portions BK1_BS_P1-BK1_BS_P3, BK2_BS_P1-BK2_BS_P3, the encoder 214 may employ either a regular interleaving scheme or an irregular interleaving scheme to interleave the fixed-length color channel bit-stream segments to generate an interleaved bit-stream BS_I.

Considering a case where the encoder 214 employs a regular interleaving scheme to generate the interleaved bit-stream BS_I, the numbers of color channel bit-stream segments for different color channels are identical, and each set of color channel bit-stream segments is composed of color channel bit-stream segments for different color channels arranged in a regular color channel order (e.g., R->G->B). For example, as shown in FIG. 8, the number of color channel bit-stream segments $CH\_R_1$-$CH\_R_{11}$ is equal to 11, the number of color channel bit-stream segments $CH\_G_1$-$CH\_G_{11}$ is equal to 11, and the number of color channel bit-stream segments $CH\_B_1$-$CH\_B_{11}$ is equal to 11. Besides, in each set of color channel bit-stream segments, a red color channel bit-stream segment is followed by a green color channel bit-stream segment, and the green color channel bit-stream segment is followed by a blue color channel bit-stream segment.

Considering another case where the encoder 214 employs an irregular interleaving scheme to generate the interleaved bit-stream BS_I, the numbers of color channel bit-stream segments for different color channels are not necessarily the same. For example, the number of Y color channel bit-stream segments is 2, the number of U color channel bit-stream segments is 1, and the number of V color channel bit-stream segments is 1. Hence, the next color channel bit-stream segment following the current color channel bit-stream segment of a specific color channel may be any color channel bit-stream segment of a color channel identical to or different from the specific color channel. For example, concatenated color channel bit-stream segments may be $CH\_Y_1+CH\_Y_2+CH\_U_1+CH\_V_1$.

Further, it is possible that the bit-stream of the one color channel is much longer than bit-streams of the remaining color channels. Specifically, due to characteristics of different color channels of blocks in a frame, the variation of an encoded bit-stream size of each color channel could be large. To maintain a fixed-sized bit-stream segment format, more bit-stream segments may be allocated to a specific color channel of blocks. On the other hand, an encoded bit-stream size of a specific color channel of a specific number of blocks may still be less than that of one bit-stream segment. In this case, the encoded bit-stream of this specific color channel for this specific number of blocks is not interleaved into the final bit-stream due to the fact that one complete bit-stream segment is not formed yet. As there is discrepancy between numbers of fixed-length color channel bit-stream segments for different color channels, the color channel bit-stream segments in the interleaved bit-stream BS_I may be arranged in an irregular color channel order (e.g., R->G->B->R->R). For illustrative purposes, considering a simple case where all color channel data of the R color channel in a block are converted into corresponding encoded color channel data with a size of $3*L_R$, all color channel data of the G color channel in the same block are converted into corresponding encoded color channel data with a size of $L_G$, and all color channel data of the B color channel in the same block are converted into corresponding encoded color channel data with a size of $L_B$, the color channel bit-stream segments arranged in the interleaved bit-stream BS_I may be $CH\_R_1+CH\_G_1+CH\_B_1+CH\_R_2+CH\_R_3$.

With regard to the actual implementation of the irregular interleaving scheme, the encoder 214 decides a color channel of a next color channel bit-stream segment by referring to color channel data encoding state(s) of previous color channel bit-stream segment(s), and then concatenates the next color channel bit-stream segment of the selected color channel to a current color channel bit-stream segment or previously concatenated color channel bit-stream segments. For example, the amount of color channel data encoded into a color channel bit-stream segment may be referenced by the encoder 214. For better understanding of technical features of the encoder 214, several examples of the irregular interleaving operation are given as below.

In one exemplary design, when a first color channel bit-stream segment of a first color channel is selected as the beginning of a bit-stream and a second color channel bit-stream segment of a second color channel is concatenated to the color channel bit-stream segment of the first color channel, a third color channel bit-stream segment is selected from one of the first color channel and the second color channel and then concatenated to the second color channel bit-stream segment of the second color channel.

The selection of the third color channel bit-stream segment is based on the amount of color channel data encoded into the first color channel bit-stream segment and the amount of color channel data encoded into the second color channel bit-stream segment. If the amount of color channel data encoded into the first color channel bit-stream segment is less than a predetermined amount (i.e., a predetermined threshold), implying that more color channel bit-stream segments are required to carry encoded color channel data of the first color channel, the third color channel bit-stream segment is selected from the first color channel; and if the amount of color channel data encoded into the first color channel bit-stream segment is not less than the predetermined amount, and the amount of color channel data encoded into the second color channel bit-stream segment is less than the predetermined amount, implying that more color channel bit-stream segments are required to carry encoded color channel data of the second color channel, the third color channel bit-stream segment is selected from the second color channel.

Alternatively, the amount of color channel data encoded into the first color channel bit-stream segment may be directly compared with the amount of color channel data encoded into the second color channel bit-stream segment. If the amount of color channel data encoded into the first color channel bit-stream segment is less than the amount of color channel data encoded into the second color channel bit-stream segment, the third color channel bit-stream segment is selected from the first color channel. If the amount of color channel data encoded into the second color channel bit-stream segment is less than the amount of color channel data encoded into the first color channel bit-stream segment, the third color channel bit-stream segment is selected from the second color channel. If the amount of color channel data encoded into the first color channel bit-stream segment is equal to the amount of color channel data encoded into the second color channel bit-stream segment, the third color channel bit-stream segment is selected based on a default color channel order. By way of example, but not limitation, the default color channel order may be configured by the encoder (and decoder) setting, the order information encoded in the bit-stream, the implicit color channel order, or the regular color channel order (e.g., a regular color channel order R->G->B).

The implicit color channel order determines the order of color channels based on the number of encoded bits of each color channel bit-stream segment. In a first exemplary implicit color channel order design, the number of encoded bits of the first color channel bit-stream segment may be directly compared with the number of encoded bits of the second color channel bit-stream segment. If the number of encoded bits of the first color channel bit-stream segment is less than the number of encoded bits of the second color channel bit-stream segment, the implicit color channel order is the first color channel and then the second color channel (i.e., the first color channel is followed by the second color channel). If the number of encoded bits of the second color channel bit-stream segment is less than the number of encoded bits of the first color channel bit-stream segment, the implicit color channel order is the second color channel and then the first color channel (i.e., the second color channel is followed by the first color channel). If the number of encoded bits of the first color channel bit-stream segment is equal to the number of encoded bits of second color channel bit-stream segment, the implicit color channel order may be configured by the encoder (and decoder) setting, the order information encoded in the bit-stream, or the regular color channel order (e.g., a regular color channel order R->G->B).

In a second exemplary implicit color channel order design, the number of encoded bits of the first color channel bit-stream segment may be directly compared with the number of encoded bits of the second color channel bit-stream segment. If the number of encoded bits of the first color channel bit-stream segment is less than the number of encoded bits of the second color channel bit-stream segment, the implicit color channel order is the second color channel and then the first color channel (i.e., the second color channel is followed by the first color channel). If the number of encoded bits of the second color channel bit-stream segment is less than the number of encoded bits of the first color channel bit-stream segment, the implicit color channel order is the first color channel and then the second color channel (i.e., the first color channel is followed by the second color channel). If the number of encoded bits of the first color channel bit-stream segment is equal to the number of encoded bits of the second color channel bit-stream segment, the implicit color channel order may be configured by the encoder (and decoder) setting, the order information encoded in the bit-stream, or the regular color channel order (e.g., a regular color channel order R->G->B).

It should be noted that the above rules of configuring the implicit color channel order are for illustrative purposes only, and are not meant to be limitations of the present invention.

In another exemplary design, a first color channel bit-stream segment of a first color channel is concatenated to a second color channel bit-stream segment of the same first color channel if the amount of color channel data encoded into the second color channel bit-stream segment is less than a predetermined amount (i.e., a predetermined threshold).

In another exemplary design, color channel bit-stream segments of the same color channel are concatenated one by one until the total amount of color channel data encoded into the concatenated color channel bit-stream segments reaches a predetermined amount (i.e., a predetermined threshold), and then at least one color channel bit-stream segment of another color channel is concatenated to the concatenated color channel bit-stream segments of the same color channel.

In another exemplary design, a color channel bit-stream segment is selected from different color channels based on the amount of color channel data of each color channel in previously concatenated color channel bit-stream segments, and then the selected color channel bit-stream segment is concatenated to the previously concatenated color channel bit-stream segments.

As shown in FIG. 2, the image compressor 202 at the TX end (e.g., one chip) transmits the interleaved bit-stream BS_I to the image decompressor 204 at the RX end (e.g., another chip). The input port 222 of the image decompressor 204 is arranged for receiving the interleaved bit-stream BS_I generated from the image compressor 202, where the interleaved bit-stream BS_I includes encoded pixel data of a frame, and is therefore composed of a plurality of color channel bit-stream segments that are concatenated. The decoder 224 is coupled to the input port 222, and arranged for decoding the interleaved bit-stream BS_I into pixel data of one or more than one block BK'. If the encoder 214 employs a lossless compression algorithm and the decoder 224 employs a corresponding lossless decompression algorithm, the pixel data of the block BK' should be identical to pixel data of the block BK, ideally. However, if the encoder 214 employs a lossy compression algorithm and the decoder 224 employs a corresponding lossy decompression algorithm, the pixel data of the block BK' may not be identical to pixel data of the block BK. Generally speaking, the block BK' at the decoder side is obtained based on how the original block BK is encoded at the encoder side.

Figure 1:
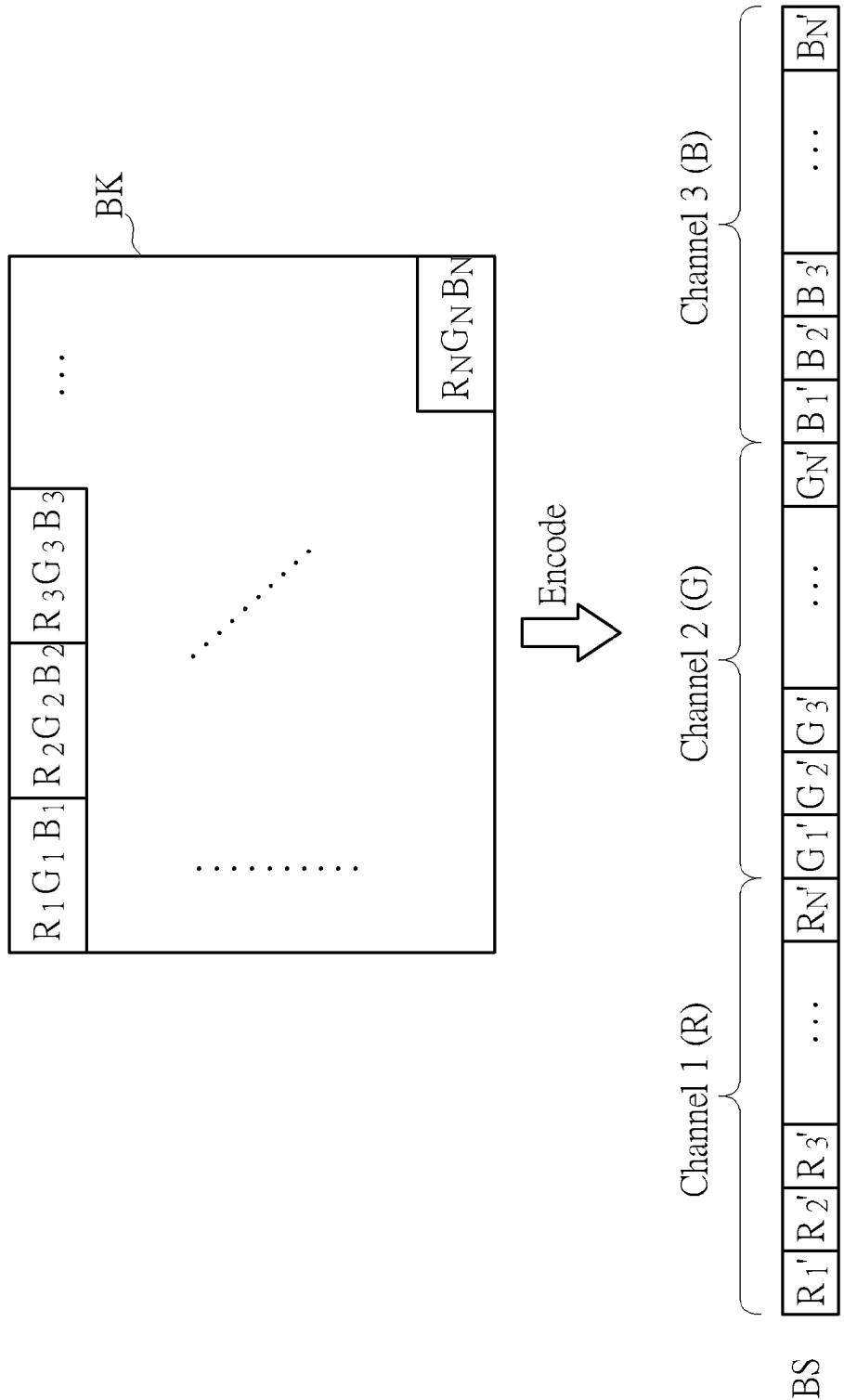
FIG. 1 is a diagram illustrating a bit-stream generated by encoding pixel data of one block according to a conventional image compression scheme.
Figure 10:
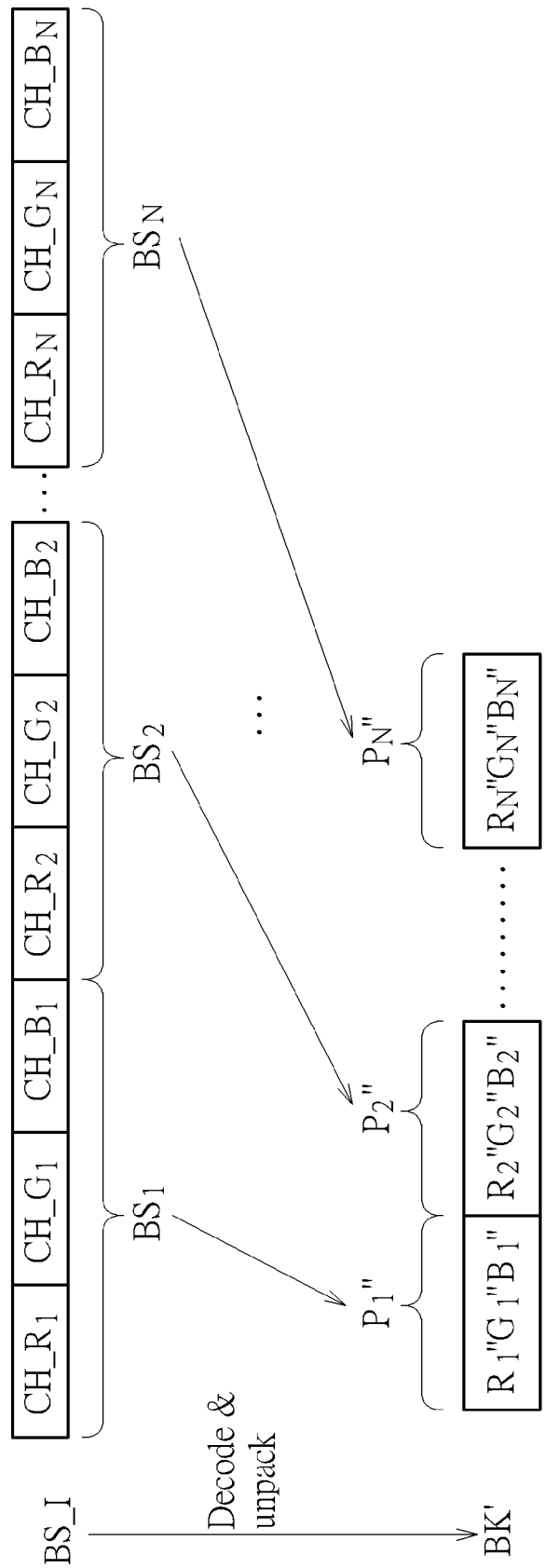
FIG. 10 is a diagram illustrating an image decompression operation according to an embodiment of the present invention.

Please refer to FIG. 10, which is a diagram illustrating an image decompression operation performed by the decoder 224 shown in FIG. 2. In this embodiment, the encoder 214 generates the interleaved bit-stream BS_I as shown in FIG. 6. As the bit-streams (i.e., sets of color channel bit-stream segments) $BS_1$-$BS_N$ are concatenated, the decoder 224 applies image decompression to the bit-stream segments $BS_1$-$BS_N$ one by one. Besides, as the color channel bit-stream segments are concatenated in each of the bit-streams $BS_1$-$BS_N$, the decoder 224 applies image decompression to the color channel bit-stream segments in the same bit-stream one by one. As shown in FIG. 6, each of the color channel bit-stream segments $CH\_R_1$-$CH\_R_N$, $CH\_G_1$-$CH\_G_N$, $CH\_B_1$-$CH\_B_N$ includes one encoded color channel data of a single pixel. Hence, the decoder 224 generates decoded color channel data $R_1"$, $G_1"$, $B_1"$, $R_2"$, $G_2"$, $B_2"$ ... $R_N"$, $G_N"$, $B_N"$ one by one, where the successive decoded color channel data $R_1"$, $G_1"$, $B_1"$ in the pixel data part $P_1"$ of the block BK' are pixel data of the $1^{st}$ pixel in the block BK', the successive decoded color channel data $R_2"$, $G_2"$, $B_2"$ in the pixel data part $P_2"$ of the block BK' are pixel data of the $2^{nd}$ pixel in the block BK', and the successive decoded color channel data $R_N"$, $G_N"$, $B_N"$ in the pixel data part $P_N"$ of the block BK' are pixel data of the $N^{th}$ pixel in the block BK'. No data buffer is needed for buffering decoded color channel data for two color channels (e.g., red channel and green channel) since decoded pixel data of pixels are generated from the decoder 224 sequentially. Compared to the conventional decompression design which requires a large-sized data buffer for buffering decoded color channel data derived from decoding the encoded color channel data $R_1'$-$R_N'$ and $G_1'$-$G_N'$ as shown in FIG. 1, the proposed decompression design has relaxed data buffer requirement and lower hardware cost. Besides, compared to the conventional decompression design, the proposed decompression design has lower processing latency for obtaining decoded pixel data of one pixel since the buffer overhead is reduced. It is self-explanatory that the proposed compression design used for generating the interleaved bit-stream BS_I would also have lower data buffer requirement and processing latency.

Figure 11:
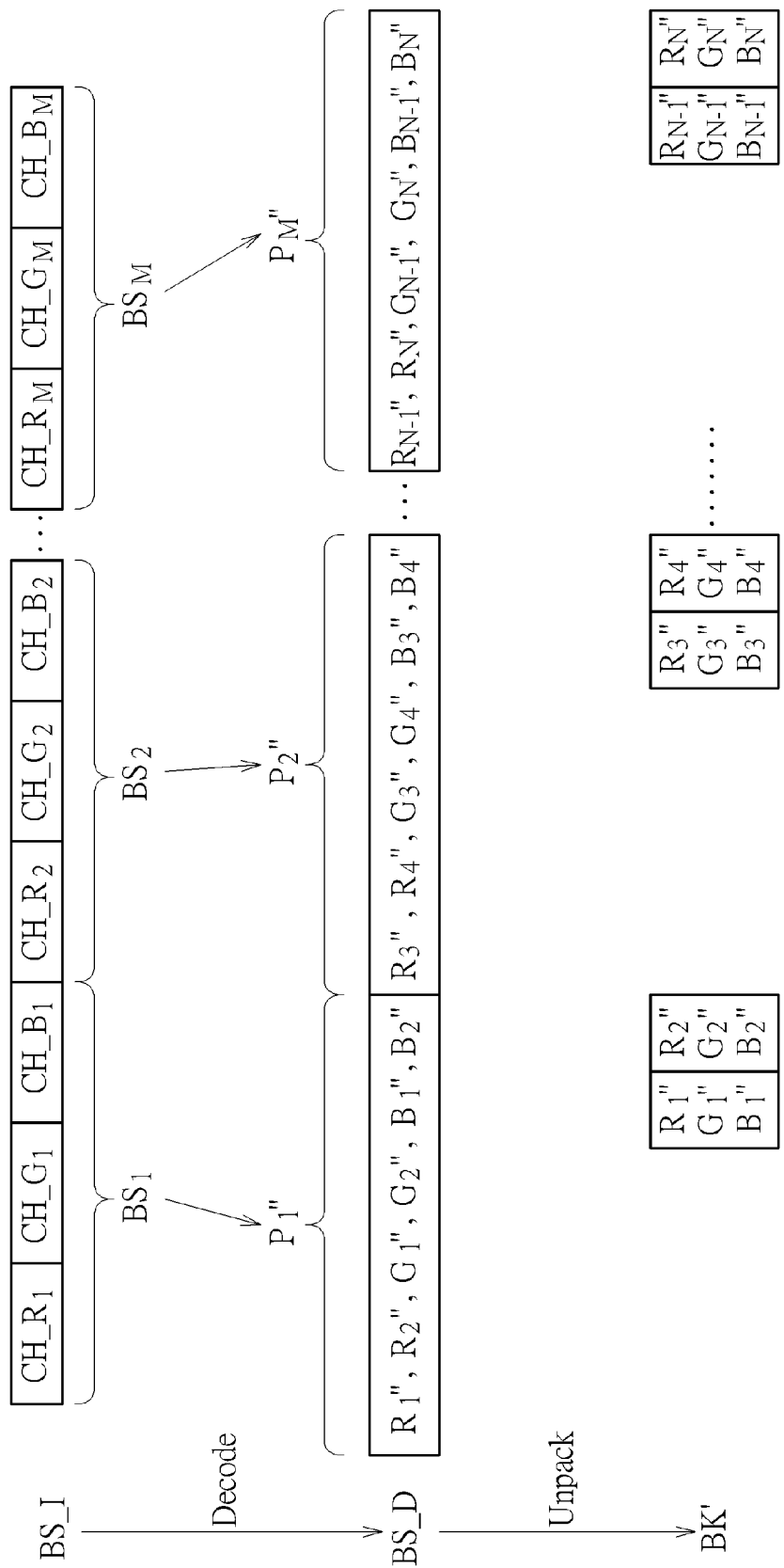
FIG. 11 is a diagram illustrating another image decompression operation according to an embodiment of the present invention.

As mentioned above, each of the color channel bit-stream segment may be generated by encoding color channel data of more than one pixel. To obtain pixel data of one pixel in the block BK', a small-sized data buffer is needed by the decoder 224 for temporarily storing decoded color channel data of the first two color channel bit-stream segments in a bit-stream (i.e., a set of color channel bit-stream segments) before the decoder 224 starts decoding the last color channel bit-stream segment in the same bit-stream (i.e., the same set of color channel bit-stream segments). Please refer to FIG. 11, which is a diagram illustrating another image decompression operation performed by the decoder 224 shown in FIG. 2. In this embodiment, the encoder 214 generates the interleaved bit-stream BS_I as shown in FIG. 7. As the bit-streams (i.e., sets of color channel bit-stream segments) $BS_1$-$BS_M$ are concatenated, the decoder 224 applies image decompression to the bit-streams $BS_1$-$BS_M$ one by one. Besides, as the color channel bit-stream segments are concatenated in each of the bit-streams $BS_1$-$BS_M$, the decoder 224 applies image decompression to the color channel bit-stream segments in the same bit-stream (i.e., the same set of color channel bit-stream segments) one by one. As shown in FIG. 7, each of the color channel bit-stream segments $CH\_R_1$-$CH\_R_M$, $CH\_G_1$-$CH\_G_M$, $CH\_B_1$-$CH\_B_M$ includes encoded color channel data of two pixels. Hence, the decoder 224 generates decoded color channel data $R_1"$, $R_2"$, $G_1"$, $G_2"$, $B_1"$, $B_2"$, $R_3"$, $R_4"$, $G_3"$, $G_4"$, $B_3"$, $B_4"$ ... $R_{N-1}"$, $R_N"$, $G_{N-1}"$, $G_N"$, $B_{N-1}"$, $B_N"$ one.

With regard to the image decompression applied to the bit-stream $BS_1$, the decoded color channel data $R_1"$, $R_2"$, $G_1"$, $G_2"$ in the pixel data part $P_1"$ of the decoded bit-stream BS_D are buffered when generated by the decoder 224 because the decoded color channel data $B_1"$, $B_2"$ are not available yet. Hence, the pixel data of the $1^{st}$ pixel in the block BK' (i.e., the decoded color channel data $R_1"$, $G_1"$, $B_1"$) is not output until the decoded color channel data $B_1"$ is generated by the decoder 224, and the pixel data of the $2^{nd}$ pixel in the block BK' (i.e., the decoded color channel data $R_2"$, $G_2"$, $B_2"$) is not output until the decoded color channel data $B_2"$ is generated by the decoder 224. Similarly, with regard to the image decompression applied to the next bit-stream $BS_2$, the decoded color channel data $R_3"$, $R_4"$, $G_3"$, $G_4"$ in the pixel data part $P_2"$ of the decoded bit-stream BS_D are buffered when generated by the decoder 224 because the decoded color channel data $B_3"$, $B_4"$ are not available yet. Hence, the pixel data of the $3^{rd}$ pixel in the block BK' (i.e., the decoded color channel data $R_3''$, $G_3''$, $B_3''$) is not output until the decoded color channel data $B_3''$ is generated by the decoder 224, and the pixel data of the $4^{th}$ pixel in the block BK' (i.e., the decoded color channel data $R_4''$, $G_4''$, $B_4''$) is not output until the decoded color channel data $B_4''$ is generated by the decoder 224. The rest can be done in the same manner. Compared to the conventional decompression design which requires a large-sized data buffer for buffering decoded color channel data derived from decoding the encoded color channel data $R_1'$-$R_N'$ and $G_1'$-$G_N'$ as shown in FIG. 1, the proposed decompression design has relaxed data buffer requirement and lower hardware cost. Besides, compared to the conventional decompression design, the proposed decompression design has lower processing latency for obtaining decoded pixel data of one pixel since the buffer overhead is reduced. It is self-explanatory that the proposed compression design used for generating the interleaved bit-stream BS_I would also have lower data buffer requirement and processing latency.

Consider a case where the encoder 214 generates the interleaved bit-stream BS_I as shown in FIG. 8/FIG. 9, where the interleaved bit-stream BS_I is generated based on a regular interleaving scheme. Similarly, the decoder 224 decodes the bit-streams (i.e., sets of color channel bit-stream segments) in the interleaved bit-stream BS_I one by one, and decodes color channel bit-stream segments in each bit-stream one by one. To obtain pixel data of one pixel in the block BK', a small-sized data buffer is needed by the decoder 224 for temporarily storing decoded color channel data because one fixed-length color channel bit-stream segment for one color channel may include encoded color channel data of more than one pixel. Taking the decoding of the interleaved bit-stream BS_I for example, the decoder 224 generates decoded color channel data for $R_1'$, $R_{21}'$, $G_{11}'$, $B_1'$, $R_{22}'$, $R_{31}'$, $G_{12}'$, $G_2'$, $B_2'$, $B_{31}'$, etc. one by one. Therefore, the decoded color channel data derived from sequentially decoding $R_1'$, $R_{21}'$, $G_{11}'$, $B_1'$, $R_{22}'$, $R_{31}'$ are buffered. When the decoded color channel data of $G_{12}'$ is obtained, the pixel data of the $1^{st}$ pixel in the block BK' is output, where the decoded color channel data for $R_1'$, $G_{11}'$, $B_1'$ are read from the data buffer. Similarly, the decoded color channel data derived from decoding $G_2'$ is also buffered. When the decoded color channel data of $G_2'$ is obtained, the pixel data of the $2^{nd}$ pixel in the block BK' is output, where the decoded color channel data for $R_{21}'$, $R_{22}'$, $G_2'$ are read from the buffer. The following decoding operation can be deduced by analogy. Thus, as a person skilled in the art can readily understand details of the image decompression operation applied to the interleaved bit-stream BS_I generated based on a regular interleaving scheme after reading above paragraphs directed to the image decompression operation shown in FIG. 10, further description is omitted here for brevity.

Consider another case where the encoder 214 generates the interleaved bit-stream BS_I as shown in FIG. 9, where the interleaved bit-stream BS_I is generated based on an irregular interleaving scheme. The decoder 224 decodes color channel bit-stream segments one by one (i.e., CH_$R_1$-> CH_$G_1$->CH_$B_1$->CH_$R_2$->CH_$R_3$->CH_$G_2$-> CH_$B_2$->... ). To obtain pixel data of one pixel in the block BK', a small-sized data buffer is needed by the decoder 224 for temporarily storing decoded color channel data because one fixed-length color channel bit-stream segment for one color channel may include encoded color channel data of more than one pixel, and encoded color channel data of a color channel of a pixel may be distributed over more than one fixed-length color channel bit-stream segment. Hence, the decoder 224 does not output the pixel data of a pixel until all color channel data of the pixel are derived from the interleaved bit-stream BS_I.

The decoding operation of the interleaved bit-stream BS_I generated based on an irregular interleaving scheme is similar to the decoding operation of the interleaved bit-stream BS_I generated based on a regular interleaving scheme. That is, the decoder 224 decodes color channel bit-stream segments one by one, stores decoded color channel data of a pixel into a data buffer if all decoded color channel data of the pixel are not available yet, and does not output the pixel data of the pixel unless all decoded color channel data of the pixel are available. The major difference is that the decoder 224 does not know the actual color channel order of these color channel bit-stream segments beforehand due to the fact that no regular color channel order (i.e., fixed color channel order) is used in this irregular interleaving case. It should be noted that the decoder 224 should follow a de-interleaving rule matching the irregular interleaving rule employed by the encoder 214 to correctly recover color channel data of different color channels from the interleaved bitstream BS_I. Hence, the decoder 224 can identify a color channel of a next color channel bit-stream segment to be decoded by referring to color channel data encoding state(s) of previous color channel bit-stream segment(s), and then decodes the next color channel bit-stream segment to generate decoded color channel data belong to the identified color channel. For example, the amount of color channel data decoded from a color channel bit-stream segment may be referenced by the decoder 224. For better understanding of technical features of the decoder 224, several examples of the de-interleaving operation are given as below.

In one exemplary design, when a first color channel bit-stream segment of a first color channel in the beginning of a bit-stream is decoded and a second color channel bit-stream segment of a second color channel that is concatenated to the color channel bit-stream segment of the first color channel is decoded, the decoder 224 decides whether a third color channel bit-stream segment concatenated to the second color channel bit-stream segment of the second color channel carries color channel information of the first color channel or color channel information of the second color channel, and then decodes the third color channel bit-stream segment to generate decoded color channel data belong to the decided color channel.

The determination of the color channel to which the third color channel bit-stream segment belongs is based on the amount of color channel data decoded from the first color channel bit-stream segment and the amount of color channel data decoded from the second color channel bit-stream segment. If the amount of color channel data decoded from the first color channel bit-stream segment is less than a predetermined amount (i.e., a predetermined threshold), the third color channel bit-stream segment is determined to contain color channel information of the first color channel; and if the amount of color channel data decoded from the first color channel bit-stream segment is not less than the predetermined amount, and the amount of color channel data decoded from the second color channel bit-stream segment is less than the predetermined amount, the third color channel bit-stream segment is determined to contain color channel information of the second color channel.

Alternatively, the amount of color channel data decoded from the first color channel bit-stream segment may be directly compared with the amount of color channel data decoded from the second color channel bit-stream segment. If the amount of color channel data decoded from the first color channel bit-stream segment is less than the amount of color channel data decoded from the second color channel bit-stream segment, the third color channel bit-stream segment is determined to contain color channel information of the first color channel. If the amount of color channel data decoded from the second color channel bit-stream segment is less than the amount of color channel data decoded from the first color channel bit-stream segment, the third color channel bit-stream segment is determined to contain color channel information of the second color channel. If the amount of color channel data decoded from the second color channel bit-stream segment is equal to the amount of color channel data decoded from the first color channel bit-stream segment, a color channel to which the third color channel bit-stream segment corresponds is determined based on a default color channel order (e.g., a regular color channel order R->G->B).

In another exemplary design, the decoder 224 refers to the amount of color channel data of each color channel in previously concatenated color channel bit-stream segments to determine that a color channel bit-stream segment concatenated to the previously concatenated color channel bit-stream segments contain color channel information of one color channel from different color channels.

In above embodiments, each pixel has three color channel data complying with the RGB format. However, this is for illustrative purposes only, and is not meant to be a limitation of the present invention. Specifically, the proposed image compression/decompression scheme may be applied to pixels each having more than one color channel data with any multi-color-channel format (e.g., YUV format). These alternative designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image compression method, comprising:
   receiving a plurality of pixels of a frame, wherein pixel data of each pixel has a plurality of color channel data corresponding to a plurality of different color channels, respectively;
   utilizing an encoder for encoding the pixel data of each pixel and generating bit-streams corresponding to the plurality of color channel data of the pixel, wherein the bit-streams corresponding to the plurality of color channel data of the pixel are separated;
   utilizing the encoder for packing bit-streams of a same color channel data of different pixels into color channel bit-stream segments, wherein the color channel bit-stream segments have predetermined sizes, respectively; and
   utilizing the encoder for concatenating color channel bit-stream segments of the different color channels into a final bit-stream.

2. The image compression method of claim 1, wherein the concatenating step comprises:
   concatenating a color channel bit-stream segment of a first color channel to a color channel bit-stream segment of a second color channel.

3. The image compression method of claim 1, wherein the concatenating step comprises:
   concatenating a color channel bit-stream segment of a first color channel to a color channel bit-stream segment of a second color channel;
   concatenating a color channel bit-stream segment of a third color channel to the color channel bit-stream segment of the first color channel.

4. The image compression method of claim 1, wherein the concatenating step comprises:
   concatenating a color channel bit-stream segment of a first color channel to a color channel bit-stream segment of a second color channel;
   concatenating a color channel bit-stream segment of a third color channel to the color channel bit-stream segment of the first color channel;
   concatenating a color channel bit-stream segment of a fourth color channel to the color channel bit-stream segment of the third color channel.

5. The image compression method of claim 1, wherein the concatenating step comprises:
   selecting a first color channel bit-stream segment of a first color channel as beginning of a bit-stream;
   concatenating a second color channel bit-stream segment of a second color channel to the first color channel bit-stream segment of the first color channel.

6. The image compression method of claim 5, wherein the concatenating step further comprises:
   selecting the second color channel bit-stream segment of the second color channel from the color channels.

7. The image compression method of claim 1, wherein each color channel bit-stream segment of a same color channel has a fixed length.

8. The image compression method of claim 1, wherein each bit-stream corresponding to single color channel data of the pixel is a color channel bit-stream segment.

9. The image compression method of claim 6, wherein the concatenating step further comprises:
   selecting a third color channel bit-stream segment from the color channels, comprising:
      comparing an amount of color channel data encoded into the first color channel bit-stream segment and an amount of color channel data encoded into the second color channel bit-stream segment;
      when the amount of color channel data encoded into the first color channel bit-stream segment is less than the amount of color channel data encoded into the second color channel bit-stream segment, selecting the third color channel bit-stream segment from the first color channel;
      when the amount of color channel data encoded into the second color channel bit-stream segment is less than the amount of color channel data encoded into the first color channel bit-stream segment, selecting the third color channel bit-stream segment from the second color channel; and
      when the amount of color channel data encoded into the first color channel bit-stream segment is equal to the amount of color channel data encoded into the second color channel bit-stream segment, selecting the third color channel bit-stream segment based on a default color channel order, and
   concatenating the selected third color channel bit-stream segment to the second color channel bit-stream segment.

10. The image compression method of claim 1, wherein the concatenating step comprises:
   concatenating a first color channel bit-stream segment of a first color channel to a second color channel bit-stream segment of the first color channel when an amount of color channel data encoded into the second color channel bit-stream segment is less than a predetermined amount.

11. The image compression method of claim 1, wherein the concatenating step comprises:
   concatenating color channel bit-stream segments of a same color channel until a total amount of color channel data encoded into the concatenated color channel bit-stream segments is larger than or equal to a predetermined amount, and then concatenating at least one color channel bit-stream segment of another color channel to the concatenated color channel bit-stream segments.

12. The image compression method of claim 1, wherein the concatenating step comprises:
   selecting a color channel bit-stream segment from the different color channels based on an amount of color channel data of each color channel in previously concatenated color channel bit-stream segments; and
   concatenating the selected color channel bit-stream segment to the previously concatenated color channel bit-stream segments.

13. The image compression method of claim 1, wherein at least one of the color channel bit-stream segments includes color channel information of different blocks of the frame.

14. An image decompression method, comprising:
   receiving a bit-stream corresponding to a frame, wherein the bit-stream is composed of a plurality of color channel bit-stream segments that are concatenated, and the color channel bit-stream segments have predetermined sizes, respectively; and
   utilizing a decoder for decoding the bit-stream into pixel data of a plurality of pixels in the frame, wherein each of the pixels has a plurality of color channel data corresponding to a plurality of different color channels, respectively.

15. The image decompression method of claim 14, wherein the bit-stream comprises:
   a color channel bit-stream segment of a first color channel that is concatenated to a color channel bit-stream segment of a second color channel.

16. The image decompression method of claim 14, wherein the bit-stream comprises:
   a color channel bit-stream segment of a first color channel that is concatenated to a color channel bit-stream segment of a second color channel;
   a color channel bit-stream segment of a third color channel that is concatenated to the color channel bit-stream segment of the first color channel.

17. The image decompression method of claim 14, wherein the bit-stream comprises:
   a color channel bit-stream segment of a first color channel that is concatenated to a color channel bit-stream segment of a second color channel;
   a color channel bit-stream segment of a third color channel that is concatenated to the color channel bit-stream segment of the first color channel;
   a color channel bit-stream segment of a fourth color channel that is concatenated to the color channel bit-stream segment of the third color channel.

18. The image decompression method of claim 14, wherein the decoding step comprises:
   decoding a first color channel bit-stream segment of a first color channel in beginning of a bit-stream;
   decoding a second color channel bit-stream segment of a second color channel, wherein the second color channel bit-stream of the second color channel is concatenated to the first color channel bit-stream segment of the first color channel.

19. The image decompression method of claim 18, wherein the decoding step further comprises:
   determining color channel information of the second color channel.

20. The image decompression method of claim 14, wherein each color channel bit-stream segment of a same color channel has a fixed length.

* * * * *